United States Patent [19]

Shiff

[11] 3,973,085

[45] Aug. 3, 1976

[54] KEY TELEPHONE SYSTEM WITH DIRECTLY ASSOCIATED STATION CARDS AND SETS

[75] Inventor: Milo B. Shiff, Anaheim, Calif.

[73] Assignee: The Anaconda Company, New York, N.Y.

[22] Filed: Sept. 26, 1974

[21] Appl. No.: 509,398

[52] U.S. Cl. .................................................. 179/99
[51] Int. Cl.² ........................................... H04Q 5/18
[58] Field of Search ............... 179/99, 18 J, 15 AT, 179/15 AL, 15 AW, 2.5 R

[56] References Cited
UNITED STATES PATENTS

| | | | |
|---|---|---|---|
| 3,098,215 | 7/1963 | Waite | 179/2.5 R |
| 3,385,935 | 5/1968 | Anderson et al. | 179/99 |
| 3,420,961 | 1/1969 | Averill, Jr. | 179/99 |
| 3,489,853 | 1/1970 | Lang | 179/15 AW |
| 3,519,757 | 7/1970 | Anderson et al. | 179/18 J |
| 3,549,820 | 12/1970 | Knollman | 179/99 |
| 3,604,857 | 9/1971 | Opferman | 179/99 |
| 3,787,631 | 1/1974 | Lewis | 179/99 |
| 3,843,845 | 10/1974 | Ridley | 179/99 |

Primary Examiner—Kathleen H. Claffy
Assistant Examiner—Gerald L. Brigance
Attorney, Agent, or Firm—William W. Haefliger

[57] ABSTRACT

A telephone system comprises a plurality of station sets, each including a plurality of key buttons, and the system includes a. a station circuit for at least one of the station sets, said station circuit including interface means for transferring data to and receiving data from its associated station set, said interface means including between 2 and 3 pairs of wires connected with the station set, one pair of which is a talk pair, and the remainder of which is or are for power transmission and for transmission of data related to line, status and audible signalling and for control information including switch status, and b. a line circuit for at least one line, each line circuit including means for transmitting control, status and talk information to, and receiving control, status and talk information from, at least one station circuit connected therewith.

8 Claims, 16 Drawing Figures

Fig. 2b.
ELECTRONIC CENTRAL UNIT FUNCTIONAL DIAGRAM

Fig. 3.
LINE CIRCUIT CARD

Fig. 4. LINE LOGIC

Fig. 6. DATA LOGIC – STATION LOGIC

Fig. 9. GENERALIZED PARTITIONS STATION SET ELECTRONICS

Fig. 5.
STATION CIRCUIT CARD

Fig. 10. STATION SET ELECTRONICS

Fig. 11. DATA FORMAT

FIG. 14.
TIMING DIAGRAM
WIDE FRAME PULSE 3,973,085

KEY TELEPHONE SYSTEM WITH DIRECTLY ASSOCIATED STATION CARDS AND SETS

BACKGROUND OF THE INVENTION

This invention relates generally to key telephone systems, and more particularly concerns simplifications to such systems including reduction in wiring requirements of the station sets.

Key Systems provide direct selection of the desired telephone line, holding capability on any line, visual indicators which show the status of each line (busy, ringing, holding) and an audible signal (ringer) which can be connected to any line. The present methods of key system design accomplish this by connecting a mechanical switch and light array at each station set via a large number of wires to a central unit which contains the common functions, i.e., ring detection, holding and common audible. All control and indication communication between the set and the central unit is accomplished with high level steady state signals on a wire (or pair) per function. In addition the talk path switching is done at the phone all of which introduces great wiring complexity, and to the end that a single pair of telephone wires is finally connected to the telephone circuits in the station set.

SUMMARY OF THE INVENTION

It is a major object of the invention to provide a key telephone system wherein the prior wiring complexity is eliminated, only two or three pairs of wires being required for connection to each phone or station set. Basically, the invention is embodied in a system comprising a. a station circuit for at least one of the station sets, said station circuit including interface means for transferring data to and receiving data from its associated station set, said interface means including between two and three pairs of wires connected with the station set, one pair of which is a talk pair, and the remainder of which is or are for power transmission and for transmission of data related to line, status and audible signalling and for control information including switch status, b. a line circuit for at least one line, each line circuit including means for transmitting control, status and talk information to, and receiving control, status and talk information from, at least one station circuit connected therewith.

As will appear, the line circuit may typically include hold latch, ringing detector and line logic elements functioning to control appropriate station circuit interface means; the station circuit includes multiplexer and encoder elements to convert signals received from the line logic into composite PWM digital data, for transmission to the station interface means; and the latter includes a common connection to which the composite data is supplied in modulated form and also to which DC power is supplied for transmission to the power supplies at the station sets, all via a wire pair other then the talk pair.

Further, each station set typically includes demodulator, data separator and decoder elements functioning as will be described to control station set key lights, and an audible ringer. Also, each station set includes monitoring means which causes the line select, hold switch and hook switch status, to control a return modulator means connected with the same wire pair to transmit return data thereon.

Also, the station circuitry may include an error detector controlled select register to receive return data transmitted from the station set, and to transmit such data to decoders operable to drive telephone line selecting relay means.

Finally, a single clock at the station circuitry controls data transmission to the station set and return data transmission from the station set, over the wire pair other than the talk pair, all in such manner as will be seen.

These and other objects and advantages of the invention, as well as the details of an illustrative embodiment, will be more fully understood from the following description and drawings, in which:

DETAILED DESCRIPTION

Figure 1A:
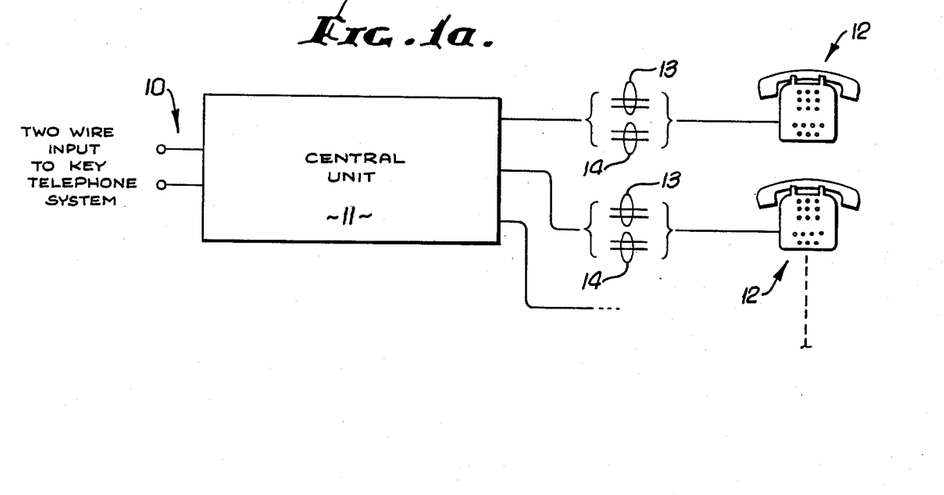
FIG. 1a is a block diagram.

Referring first to FIG. 1a, a two wire input at 10 to a telephone system is shown as connected to a central unit 11. The latter is connected with each of the station telephone sets 12 (there being "n" sets in a group) via two active pairs of wires designated at 13 and 14. This is to be distinguished from prior systems wherein a large number (50 for example) of wires are typically connected with each set 12. In this regard, pair 13 may be a talk pair, and pair 14 may carry power and data.

Figure 1B:
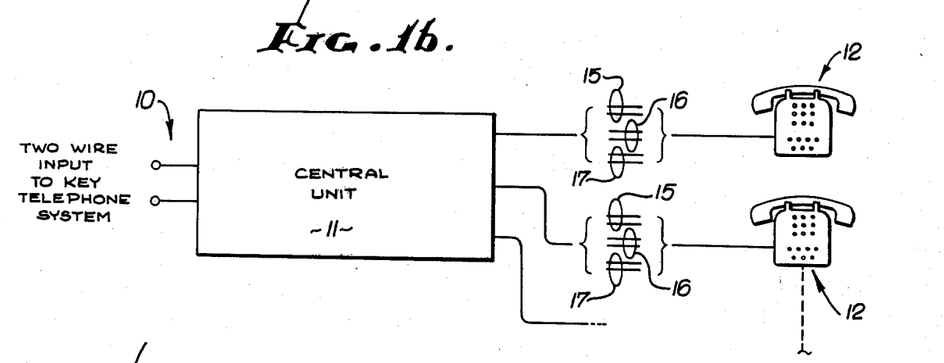
FIG. 1b is a block diagram.

Referring next to FIG. 1b, it is like FIG. 1a, except that the central unit 11 is connected with each of the station telephone sets 12 via three active pairs of wires 15, 16 and 17. As before, pair 15 may be a talk pair, and pairs 16 and 17 may carry power and data. The description herein will mainly concern the FIG. 1a (two pair of wire) system, although it will be understood that the FIG. 1b (three pairs of wires) system may be used.

Figure 2A:
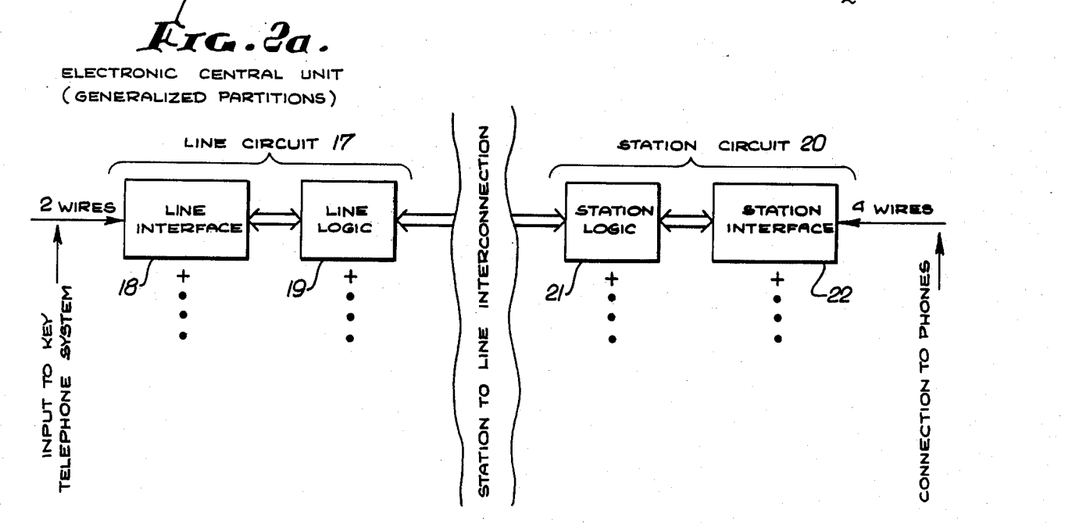
FIG. 2a is a block diagram.
Figure 2B:
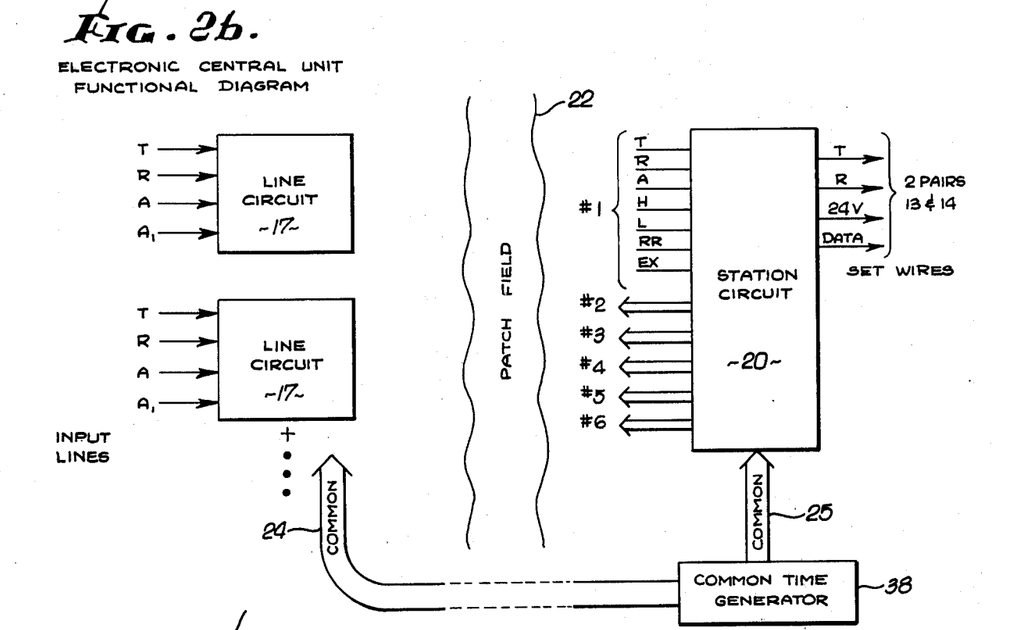
FIG. 2b is a block diagram.
Figure 3:
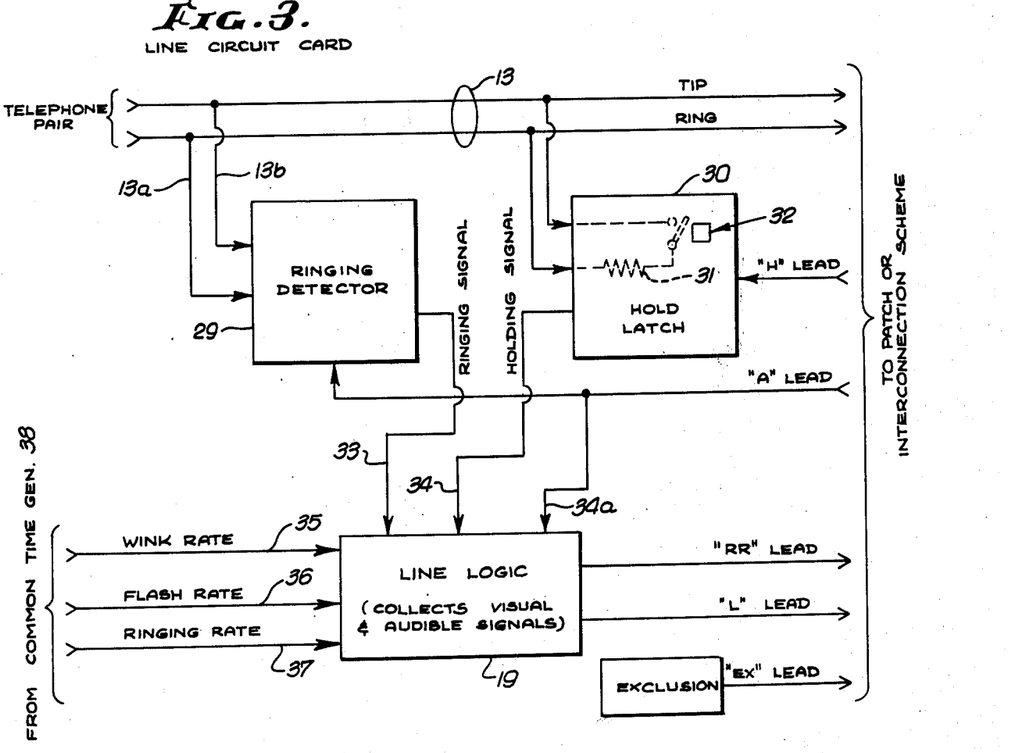
FIG. 3 is a block diagram showing a line circuit, (i.e. line circuit card)

Turning now to FIGS. 2 and 3, they show the breakdown of the station circuits from the incoming line circuits, in the central unit 11. Each line circuit or "card" 17 includes a line interface circuit 18 and a line logic circuit 19, and each station circuit or "card" 20 includes a station logic circuit 21 and a station interface circuit 22. A patch field 23 exists between the line circuitry 17 and the station circuitry 20. The patch field connections in FIG. 2b are similar to those required by standard KEY systems, and are given similar designations. However, the connections are accomplished within the central unit cabinet rather than at large connection blocks mounted on the wall of the equipment room.

The line circuit card 17 has the following functions: (1) the direct interface with the telephone line including any noise or extraneous signal protection that is desired, (2) detection of ringing signals, (3) the holding function, (4) the gathering and transmittal of a line status information for light display, (5) the common audible function associated with the ringing detector, and (6) the receiving of line select information from various ones of the station circuits. The station circuit card 20 has the following functions: (1) the gathering of the line status or light information from various line circuits which are associated with its station and transmittal to the station, receiving line select commands and HOLD commands from the station set and connecting the talk pair to the appropriate line, (2) generating the appropriate signals which control the line circuit, receiving the common audible signals and transmitting these to the station set and, (3) operation of the exclusion feature. The common circuits designated at 24 and 25 in FIG. 2b provide the time base for data flow to and from the station sets and the timing for wink and blink functions and for common audible signals, as will appear.

Implementation of system control is accomplished with reference to the following considerations. In this regard, information is sent down to the station set 12 on an as-needed basis. This requirement originates from the scan rate required to strobe or refresh the LED (light emitting diode) indicators for the line status. A rate acceptable for this type of indication is approximately 64 times a second. This means that the required data rate is some multiple of that i.e. 64 based on the number of lines involved. Individual ON bits or a 1 bit for a particular portion of the frame determines whether or not the LED at the set will be turned on at that particular scan interval. The wink, flash or busy functions determine the LED visual appearance. This information is embedded in the data stream at the central electronics. Then it is only necessary for the station set to respond to each and every bit as it occurs and to provide a stroke pulse to the LED, or not, at each scan interval. This particular scheme yields a very simple set of logic at both the central unit and at the station set.

The return information consists of individual bits corresponding to the status of the switches so that all switches are scanned continuously at the rate at which the refresh data is sent down the line. Therefore the data rate of the return data is identical to the rate at which the LED lights are strobed.

Figure 4:
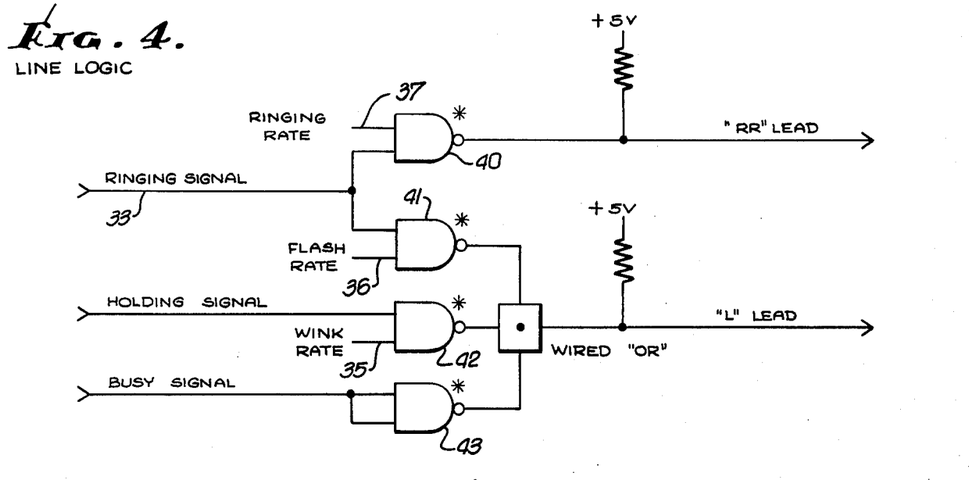
FIG. 4 is a circuit diagram showing line logic as used in FIG. 3.

Referring to FIGS. 2a, 3 and 4, the line interface circuit includes a ringing detector 29 and a hold latch 30. Note that there is an "H" lead that doesn't appear in the standard key system terminology. On receipt of a signal on the "H" lead, the hold latch 30 bridges a resistor 31 across the tip and ring of the telephone path 13. This is done with a relay 32 for optimum isolation, The "A" lead functions in the same manner as standard key systems informing the hold circuit to release, and resets the time out circuits on the ringing detector 29. The "A" lead indicates, when transmitting a signal, that some station circuit associated with that line card 17 has seized the line and that it is now busy. The holding signal and ringing signals are made available as via leads 33 and 34 to the remainder of the line circuit card, via logic 19, in order that this information may be transmitted to the appropriate station interfaces for visual display and audible signaling. Leads 13a and 13b connect the talk pair 13 with the ringing detector 29.

Figure 12:
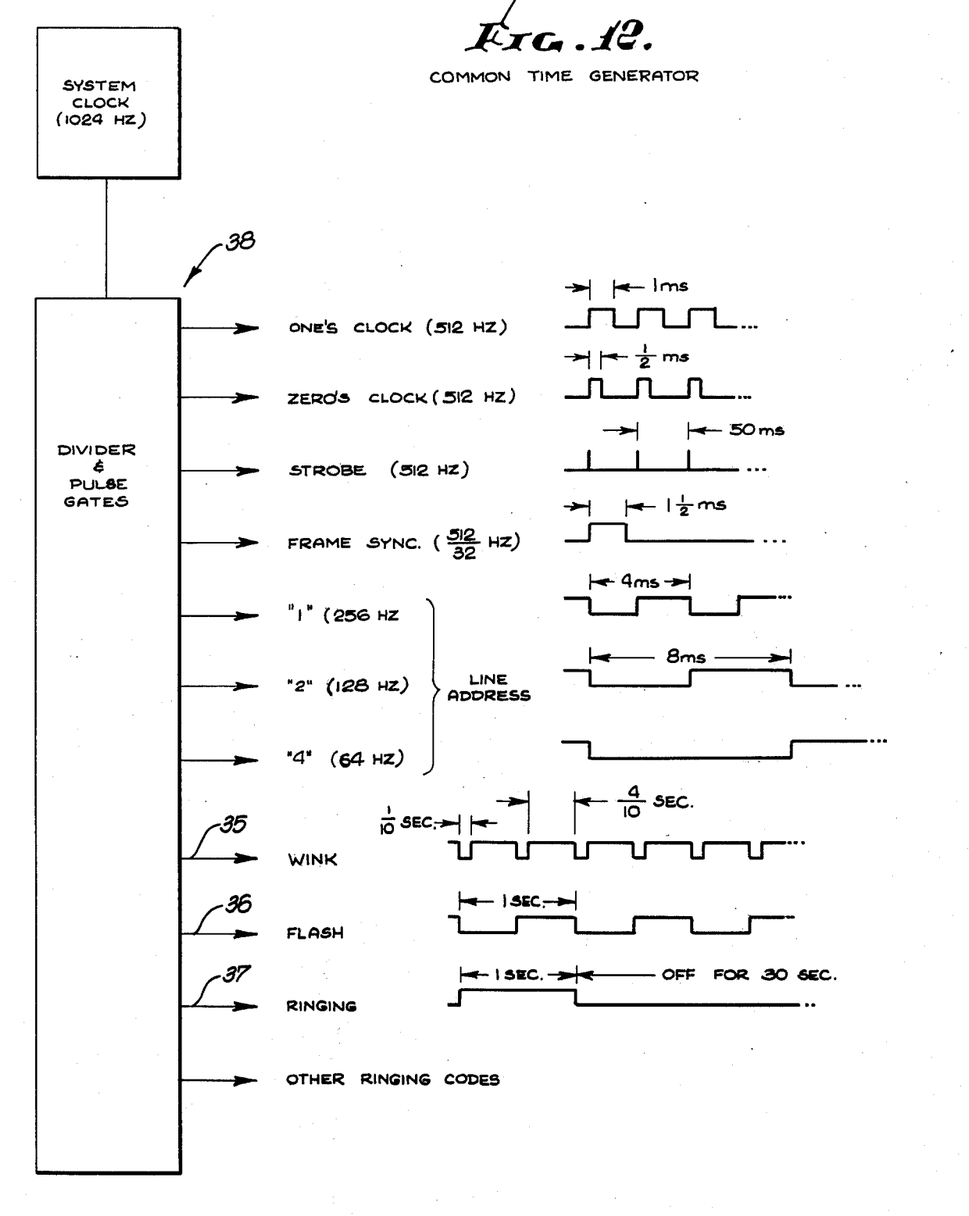
FIG. 12 is a common time generator diagram.

The primary function of the line logic 19 is to drive the "L" or lamp lead and the "RR" or ringing lead. The flash rate and the wink rate signal are superimposed on these L and RR signals in order that the transmission of such information to the station set is interrupted at the proper rates, because the information at the station set is refreshed directly on an as-needed basis. Wink rate, flash rate and ringing rate signals are provided in input 35–37 from the common time generator 38, better seen in FIG. 12 and FIG. 2b and located at the common circuitry 24 and 25.

The line logic may be mechanized by employing NAND gates 40–43 connected as shown in FIG. 4.

Figure 5:
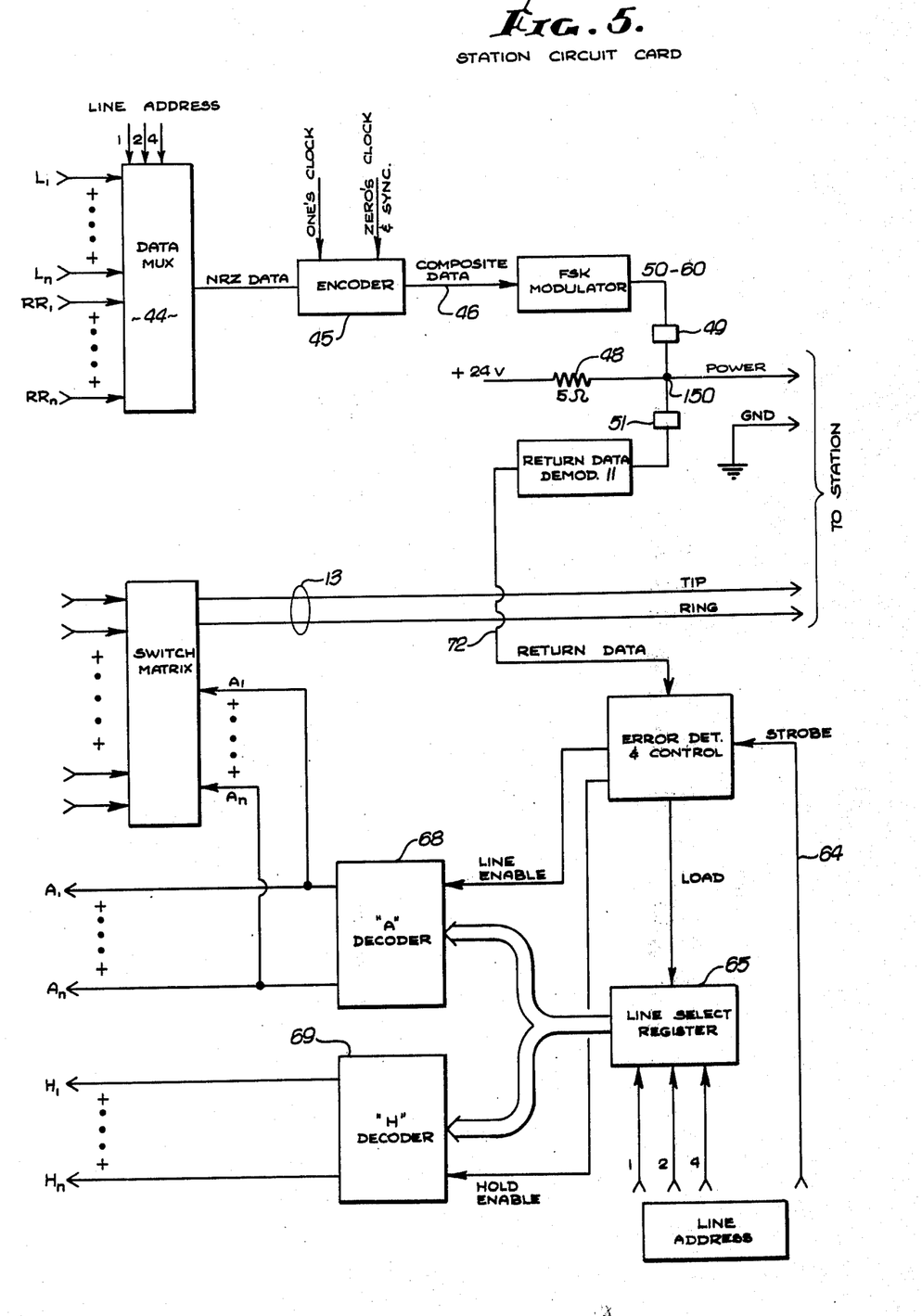
FIG. 5 is a block diagram showing a station circuit (i.e. station circuit card)
Figure 6:
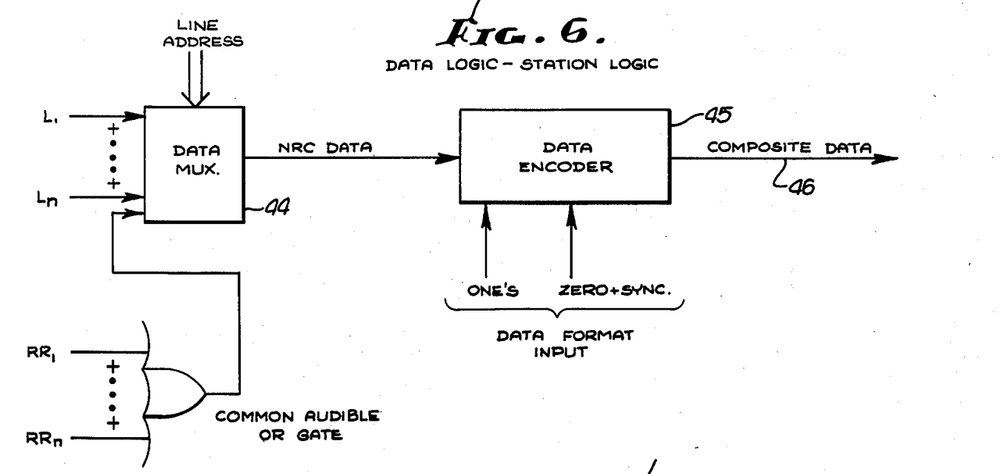
FIG. 6 is a block diagram showing station logic as employed in FIG. 5.
Figure 11:
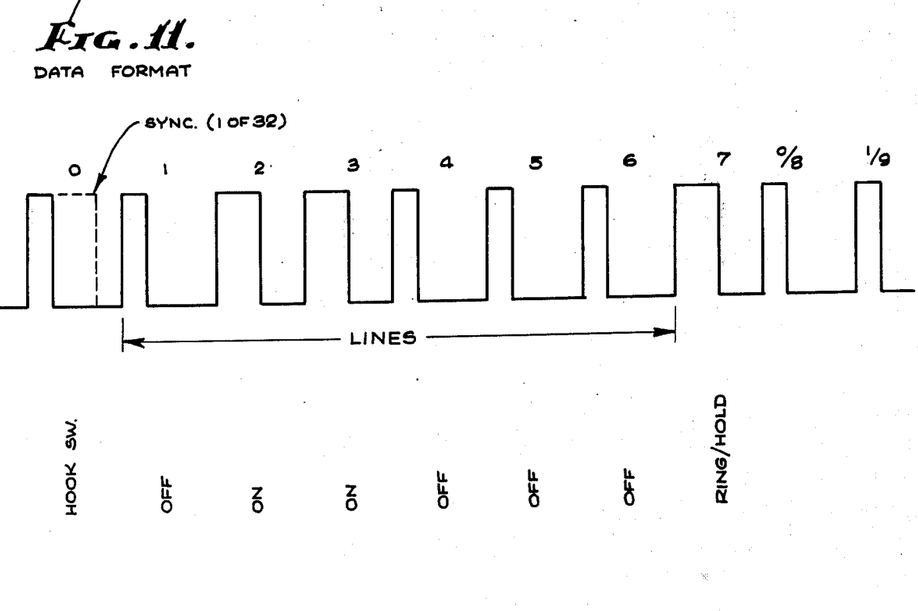
FIG. 11 is a data format.
Figure 13:
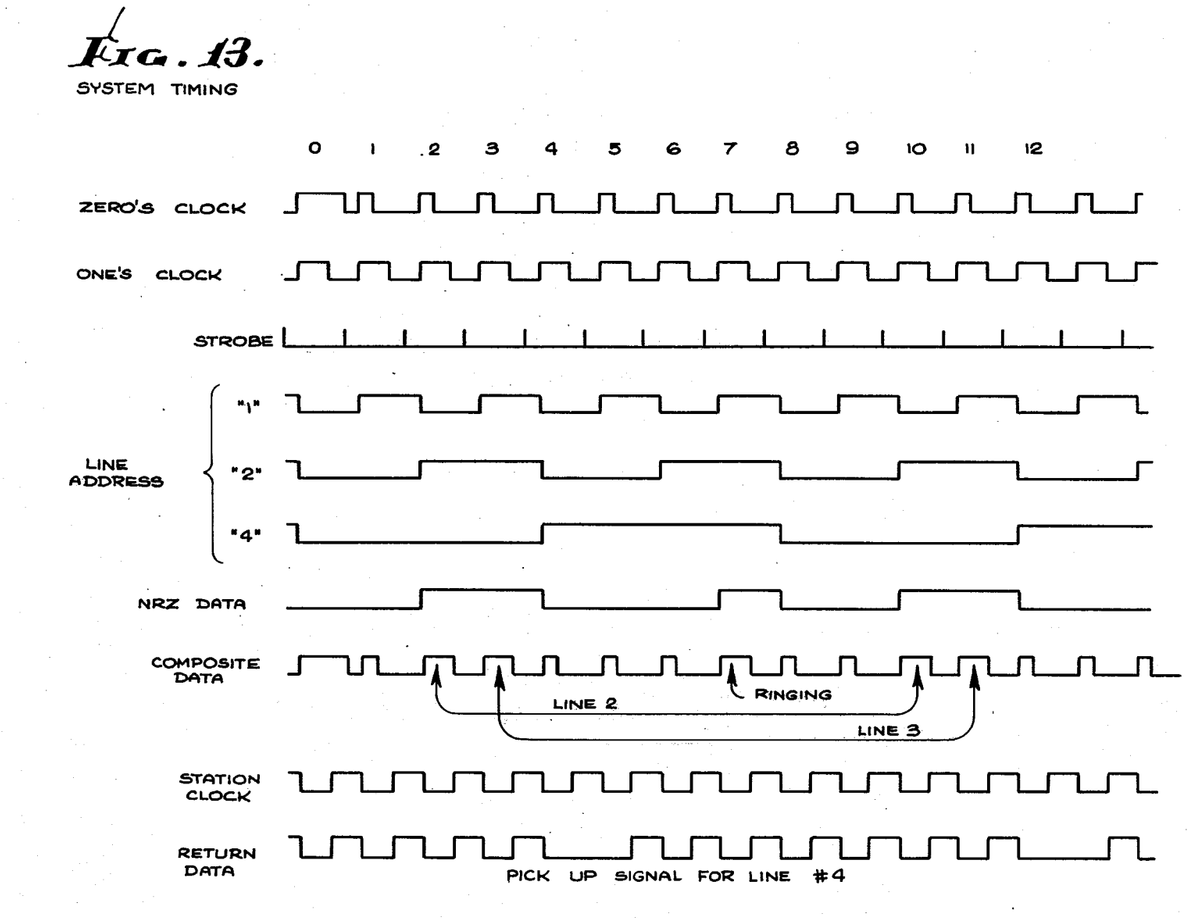
FIG. 13 is a system timing diagram.
Figure 14:
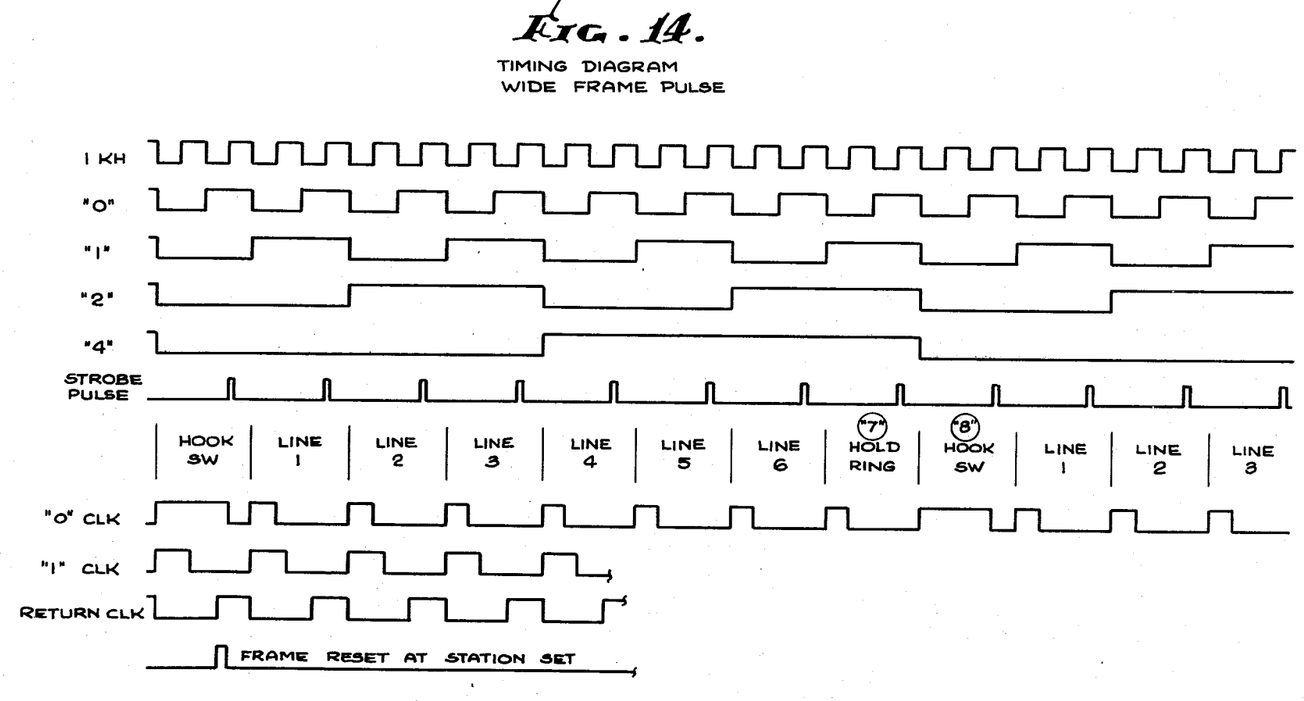
FIG. 14 is a wide frame pulse timing diagram.

Referring to FIG. 5, the station circuit card 20 shown is provided, by the illustrated connections at the upper left side of the diagram, with the appropriate light and ring information, which is transmitted in turn to the station set associated with that particular station card. This information is scanned in the data logic section (also shown in FIG. 6), encoded, modulated and transmitted as a serial data stream to the station set. FIGS. 5 and 6 show the operation of this technique. In this case, the "L" and "RR" (ring and hold) signals are presented as steady state information (not considering the flash, wink, etc. interruptions). Output from the data multiplexer 44 (which is controlled by the line address) is therefore a stream of NRZ 1's and 0's, as also seen in FIG. 13. The data encoder takes the 1/0 information and adds the timing format. This provides the embedded clock and pulse width encoding. The sync is added to the 0 format during a period which never produces a 1 output from the data multiplexer, namely the zero period. FIG. 11 shows the data format as it might appear for a 6-line phone. Note here that the sync appears once in a frame of 32 bits. Therefore, on the 6-line phone the information is repeated four times within the frame. The composite data is sent at 46 to the interface portion 22 of the station card, also seen in FIG. 8, for transmittal to the station set via pair 14. The interface portion 22 also sends a stream of return data at 47 to the logic section for line selection, hold commands and soforth.

Figure 8:
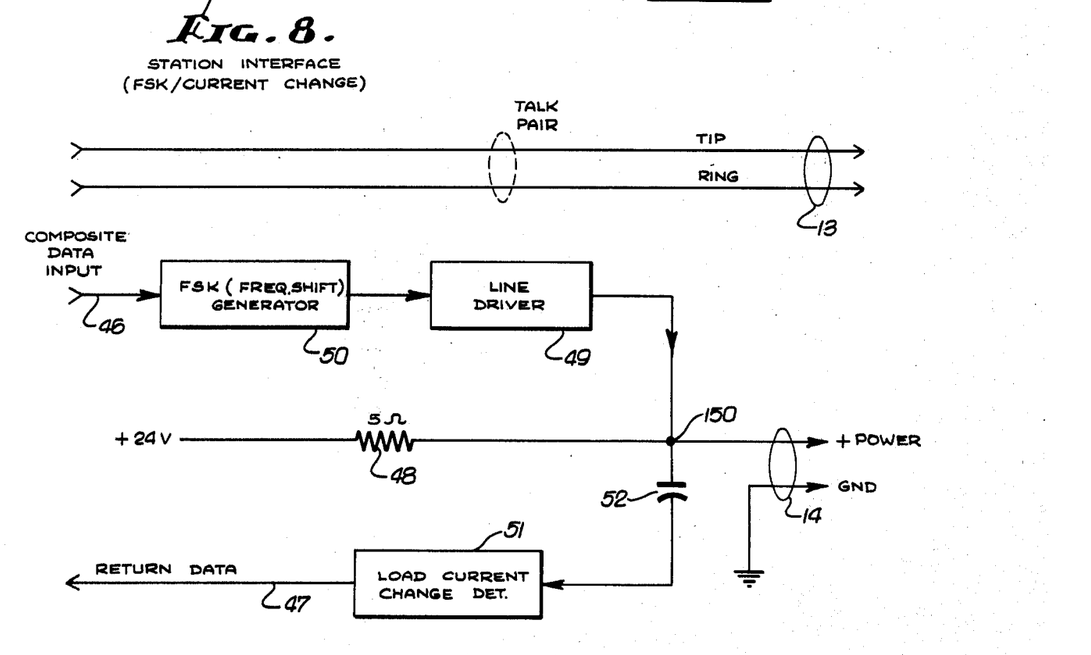
FIG. 8 is a station interface circuit as employed in FIG. 5.

The station interface in FIG. 8 comprises those circuits which are associated with the control path transmission. The control path must provide DC power for operation of the station set circuits, input information for line status and the return data from the phone as a result of operation of the switches. DC power is provided through a resistor 48 to a common connection 150 which allows the superimposition of modulated signals on top of the DC voltage or whatever remains after the current drop through the resistor. The line driver 49 simply reflects a load change across the resistor at the carrier rate. The frequency shift generator 50 produces a carrier, typically centered at approximately 50 khz, which shifts its frequency in synchronization with composite data rate changes.

This results in a carrier superimposed on top of the DC at an amplitude of approximately 2 to 500 millivolts, for example. The return data is modulated onto the power supply line by varying the current load in a similar fashion; however, this is done directly at the data rate of the return data. The information for current change has embedded in it clock data which is derived from the clock data sent to the station set, so that there is a continuous load current change regardless of the desirability of sending return data back. By using a clock derived from the down stream data, it is possible to have a data response at such time that the return data may be sampled by the common strobe pulse, which occurs between said clock pulses. This means that if the only data returning is the system clock, then it will be ignored; but, if during an address period corresponding to a particular line, a switch is actuated, this will cause a current load change which is continuous between two consecutive clock periods and will cause a return data output to show a "true" condition when the actual strobe at the station logic occurs. Note that the load current change detector 51 is simply capacitively coupled at 52 to the power line. Therefore, all effects of DC level have been removed and the circuit becomes self adjusting.

Figure 9:
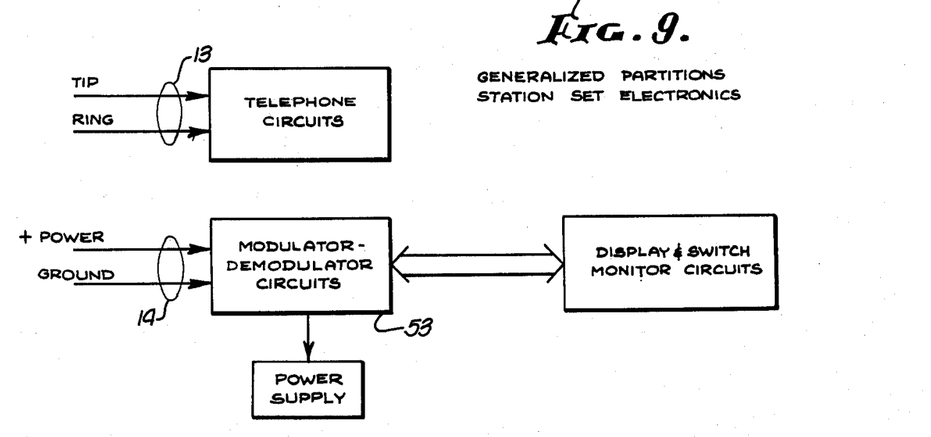
FIG. 9 is a block diagram showing station set circuitry.
Figure 10:
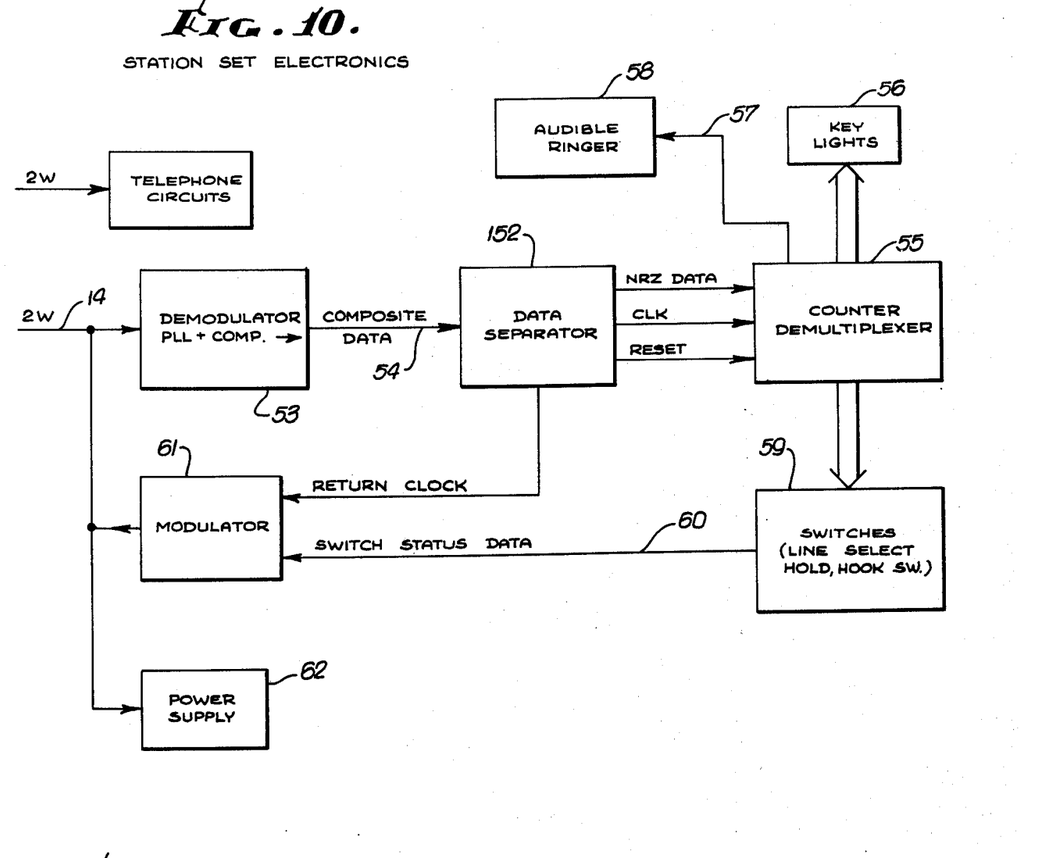
FIG. 10 is a more complete diagram showing section set electronic circuitry.

FIG. 9 shows a generalized view of the functions in the station set. Again, note that the telephone circuits are separate, and standard parts are used. Therefore, they have no direct impact on the control path, FIG. 10 shows the method of operation. The signal coming down the line 14 first goes into a FSK demodulator 53 consisting of a phase locked loop with appropriate filtering and comparator circuits which recognize the difference in the two states. The output of the comparator at 54 is a logic stream essentially identical to the composite data which entered the modulator at the station circuit. The leading edge of each bit of data is used to drive the clock circuits and the data separator 152. The NRZ data is decoded by the use of the separated clock data. The NRZ data is delayed from the incoming data by approximately a third of a bit period.

When the sync bit is detected once each frame, it is used to reset or synchronize the decoder or demultiplexing counter 55. Basically the counter is driven by the clock and is reset once each frame to assure synchronization, even though operation would continue for long periods of time without such synchronization. The output of this counter is decoded and used to directly drive the respective lights 56 of the station set when the decoder is enabled. The NRZ data is used as an "enable" for the output of the decoder, which means that when the NRZ data is a ONE, the light corresponding to the line address in the counter in the counter will be strobed giving a current pulse every sixty fourth of a second. It can then be seen that the NRZ data referenced to the counter will in effect determine whether a light is on or off. For the steady indication of a light it will be refreshed sixty four times a second continuously, Those lights which are indicating a flash or a wink will be refreshed for their "ON" period and will receive no data for their "OFF" periods. Therefore they will appear to be flashing or winking as the case may be.

The same decoder 55 has an output at 57 corresponding to the audible ringer. The ringer 58 will be strobed also at the sixty four times a second during the period of time a ringing signal is to be heard. The tone generator uses this output to produce the audible tone continuously for the period that it is receives pulses from the decoder. At the same time that the lights are being strobed, the switches 59 are being interrogated by the decoder. The switches are arranged with a common output lead 60 so that any switch which is selected will cause the modulator 61 to react. The switches are each polled at a particular time, so that if for example line 1 switch is closed and the decoder is at the count of 1, the output will cause the modulator 61 to respond. The form of return modulation is a load current change. In this case the clock signal which is returned on a continuous basis back to the station circuit card is mixed (OR'd) with the signal from the particular switch in question.

The power supply 62 has the function of providing a reasonably regulated supply as required by the various circuits. In addition, it has the job of maintaining a constant current load on the station interface so that the only changes reflected back are those produced by the modulator 61.

Referring back to FIG. 7, each switch (at the station set) is scanned at the appropriate time slot (as determined from the data stream which was send down to the station set). The strobe signal on lead 64, which comes from the common timing card, provides the time at which the return data is to be interrogated to determine if a signal has returned from a particular switch. When a return signal is present on input 72, the line address associated with the particular switch is loaded into the select register 65. The select register holds this information on a steady state basis until changed by subsequent return data signals. This address is decoded into individual lines which drive the relays for selection of the telephone line desired and provide the "A" leads for the signaling to the appropriate line circuits.

Figure 7:
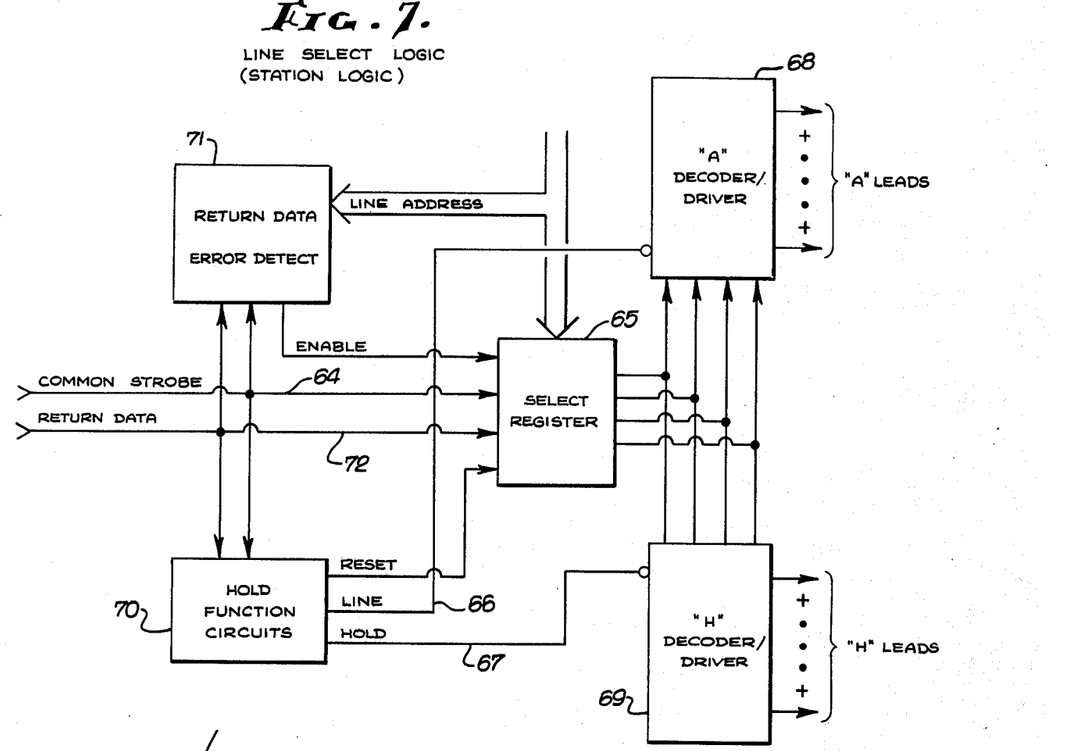
FIG. 7 is a circuit diagram showing line select logic as employed in FIG. 5.

When a return data signal is detected as the HOLD command, the sequence of events as follows is initiated. The line output at 66 to the "A" decoder 68 is turned OFF and the hold signal at 67 to the "H" decoder 69 is turned ON. This immediately drops the relay which has been selected, dropping the telephone path, turns off the "A" lead signal and sends out a signal on the appropriate "H" lead to cause the associated line card to go into the HOLD mode. Up to this time the contents of the select register 65 has not changed. The next strobe signal on lead 64 is interpreted by the hold function circuit 70 as a RESET command, which clears the select register 65, disables the "H" decoder 69, and re-enables the "A" decoder 68 (which is now driven by the null line address "zero" and results in no pickup).

The description up to this point has ignored the function of the return data error detector 71. However, this circuit must operate and provide an ENABLE before the sequences just described can be initiated. Each time there is a return data signal, it is first loaded into the error detector 71, which monitors the return data continuously. If exactly one fourth frame later the error detector receives a response on the return data line 72, it is counted as valid information. The error detector can be set to require a number of such returns before it finally enables a response. This scheme of error detection, or more properly error rejection, requires that the data return from a particular switch occurs once each 8 clock periods a frame and not more than once in each 8 clock periods, or for a predetermined numbers of these 8 clock period groups.

I claim:

1. In a telephone system comprising a plurality of station sets, each including a plurality of key buttons,
   a. a station circuit for each one of the station sets, each station circuit including interface means for transferring data to and receiving data from its associated station set, said interface means including between 2 and 3 pairs of wires connected with the station set, one pair of which is a talk pair, and the remainder of which is or are for power transmission and for transmission of data related to line, status and audible signaling and for control information including switch status, and b. a line circuit for at least one line, each line circuit including means for transmitting control, status and talk information to, and receiving control, status and talk information from, at least one station circuit connected therewith, the line circuit including line logic means to transmit to a station circuit interface means information corresponding to holding or ringing signals, for visual display and audible signaling at the station sets, c. said station circuit including a data multiplexer and encoder for receiving ringing and hold signals transmitted from at least one line logic means, and for converting said signals into composite digital data which is pulse width encoded and modulated, for transmission to said interface means, d. said interface means comprising a common full duplex transmission junction to which said encoder is operatively connected and to which said composite data is supplied in modulated form, there being a DC power source connected to said junction and said junction connected to said station sets via a remaining wire pair, and e. each station set including circuitry comprising a demodulator to receive and demodulate the modulated composite data, a data separator connected with the output of the demodulator to separate information data from clock data, decoder means responsive to the data separator output to drive station key lights and an audible ringer, the decoder means also driving line select HOLD and HOOK switches to produce corresponding return control data, and the station set including a modulator operatively connected with the data separator to receive return clock data, and with said switches to receive switch status data, the modulator output also connected with said remaining wire pair to transmit return data thereon and to said junction, in full duplex relation, whereby only one system clock is required, f. the station circuit including circuitry connected with said junction to receive said return data, and responsive to a HOLD command in the return data to transmit a HOLD signal to the line circuit.

2. The system of claim 1 wherein there are two of said pairs of wires, for each station set.

3. The system of claim 1 wherein there are three of said pairs of wires, for each station set.

4. The system of claim 1 wherein said line circuit includes hold latch means operatively connected with at least one station circuit and with the talk pair to be responsive to a control signal received from said station circuitry to connect resistance across the talk pair.

5. The system of claim 4 wherein the line circuit includes a ringing detector connected across the talk pair, there being an "A" lead connected with the ringing detector to transmit a signal indicating that a station circuit has seized a line which is busy, and line logic means operatively connected with the ringing detector and hold latch to transmit to a station circuit interface means information corresponding to holding or ringing signals, for visual display and audible signaling at the station sets.

6. The system of claim 5 wherein the line logic means has wink rate, flash rate and ringing rate inputs for superimposing the wink and flash signals onto said holding or ringing signals transmitted to the station circuit interface means.

7. The system of claim 1 including a load current change detector capacitatively coupled to the said junction and through which return data is transmitted to said last named circuitry, there being a common time generator for the system and electrically connected therewith.

8. The system of claim 1 wherein said last named circuitry includes an error detector controlled select register to receive said return data and to transmit said data to decoders operable to drive telephone line selecting relay means.

* * * * *